United States Patent [19]

Crook, Jr.

[11] 4,106,284

[45] Aug. 15, 1978

[54] SPRING-BIASED SPLIT-SLEEVE COUPLING PIN RETAINER

[75] Inventor: Edward J. Crook, Jr., Tulsa, Okla.

[73] Assignee: American Hoist & Derrick Company, Tulsa, Okla.

[21] Appl. No.: 822,734

[22] Filed: Aug. 8, 1977

[51] Int. Cl.² .......................................... F16G 15/04
[52] U.S. Cl. .................................................... 59/85
[58] Field of Search .................... 59/85, 84, 86, 87, 93

[56] References Cited

U.S. PATENT DOCUMENTS

| Re. 27,620 | 4/1973 | Crook | 59/85 |
|---|---|---|---|
| 3,134,221 | 5/1964 | Bergman | 59/85 |
| 3,373,560 | 3/1968 | Manney | 59/85 |
| 3,828,550 | 8/1974 | Fink | 59/85 |
| 3,846,978 | 11/1974 | Schreyer | 59/85 |
| 3,899,873 | 8/1975 | Fink | 59/85 |

FOREIGN PATENT DOCUMENTS

| 2,353,911 | 7/1975 | Fed. Rep. of Germany | 59/85 |
|---|---|---|---|
| 1,034,979 | 7/1966 | United Kingdom | 59/85 |

Primary Examiner—C.W. Lanham
Assistant Examiner—Gene P. Crosby
Attorney, Agent, or Firm—Head, Johnson & Chafin

[57] ABSTRACT

A coupling link having two half links, each half link comprising a U-shaped member, each of the ends of each of the arms of the U-shaped members having at least one ear. The plurality of ears each have an opening therethrough, the axes of the openings being substantially perpendicular to the arms of the U-shaped members. The plurality of ears are adapted to interact with each other so that the openings through the ears will be coaxial and will be adapted to receive a hardened steel pin which will lock the two halves of the link together. The pin is locked into position within the openings of the ears by means of a spacer which is adapted to fit between the ears and is in the form of a cylindrical spacer split along a diameter. The internal diameter of the spacer is substantially the same as that of the pin. A circular or cylindrical spring means is provided to surround the outer surface of the spacer, and to press the two halves of the spacer together, so that they will press against the pin with sufficient force to prevent the pin from moving longitudinally.

11 Claims, 9 Drawing Figures

SPRING-BIASED SPLIT-SLEEVE COUPLING PIN RETAINER

CROSS-REFERENCE TO RELATED PATENT

This invention is related to and is an improvement over U.S. Pat. No. Re. 27,620 reissued Apr. 17, 1973.

BACKGROUND OF THE INVENTION

1. Field of the Invention

This invention lies in the field of coupling links for joining sections of chain, and attaching fittings to chains and similar devices.

More particularly, it concerns a type of link which can be assembled easily in the field and can be disassembled with equal facility.

2. Description of the Prior Art

In the prior art, various types of coupling links with pins have been provided in which the pin is held by a number of different methods within the openings in the two halves of the link. One method is to hold the pin by means of a head on one end and a cotter pin, or other locking means, on the other end. In this type of construction, the pin extends beyond the outer surfaces of the coupling link, and provides certain difficulties in the use of the device, and is to be avoided.

Another type of coupling unit is illustrated by the reissue U.S. Pat. No. Re. 27,620, in which the pin is held in position in the coupled half links, by means of a spring sleeve. The unit is assembled by slipping the pin through a pair of ears and a meshed tongue, then through the spring sleeve, being driven into the sleeve by means of a hammer or a similar tool, and then through the other pair of ears.

While this type of spring sleeve provides adequate holding capacity for the pin, it does not hold the pin most effectively. Although the inner surface of the spring sleeve may be a cylindrical surface in its unstressed condition, when the pin is driven into the spring sleeve, the pin being larger in diameter than the inner diameter of the sleeve, the sleeve will be expanded to accommodate the entrance of the pin. Therefore, the cylindrical inner surface will be distorted and the sleeve will contact the pin along a few longitudinal lines along the surface. This will not provide a large area of frictional contact, which is desired to hold the pin in position. Furthermore, because of the fact that the spring does not contact a large area of the surface, the unit pressure along the few lines of contact will be so great that, in the process of inserting the pin into the sleeve and also in driving it out, the inner surface of the spring is scored, notched or gouged. Because the sleeve is under extreme stress these scored, notched or gouged areas become undesirable stress raisers or likely areas of failure.

SUMMARY OF THE INVENTION

It is a primary object of this invention to provide a coupling link for attachment of fittings, as, for example, a chain, wherein the link can be readily assembled and disassembled, and requires no special tools.

It is a further object of this invention to provide a spacer for the coupling link, which is adapted to hold the interconnecting pin in its proper position within the half links, and which will provide a large surface of contact between the pin and the spacer, whereby under the compressive force of the cylindrical spring element, the spacer will provide adequate frictional force against the longitudinal movement of the pin.

These and other objects are realized and the limitations of the prior art are overcome in this invention, by having a link typically made up of two half links, each comprising a U-shaped structure with at least one ear on each arm of the U. Each of the ears has an opening of a selected diameter so that the half links can be meshed together in such a way that a hardened steel pin can be inserted through the openings in all of the ears. This will lock the two half links together and provide adequate strength to the link.

The improvement lies in the method of locking the pin within the openings through the plurality of ears. The invention is not related to any specific form of link, and several possible arrangements are illustrated.

The method of locking the pin in position in the link, is to provide a cylindrical spacer split along a diametral plane, of suitable length to fit freely between the inner surfaces of the ears when the two half links are meshed. These two halves of the cylindrical spacer have an internal bore which is very slightly larger than the outer diameter of the pin so that when the two halves are pressed around the end there is substantially uniform complete contact between the inner surface of the spacer and the pin.

A circular or cylindrical spring means surrounds the outer surface of the spacer pressing the two halves together such that when the pin is driven into the spacer, the two halves will be slightly separated and held by the spring means with a selected unit pressure on the outer surface of the pin. Because of the large area of contact adequate friction can be provided with a minimum of unit force.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
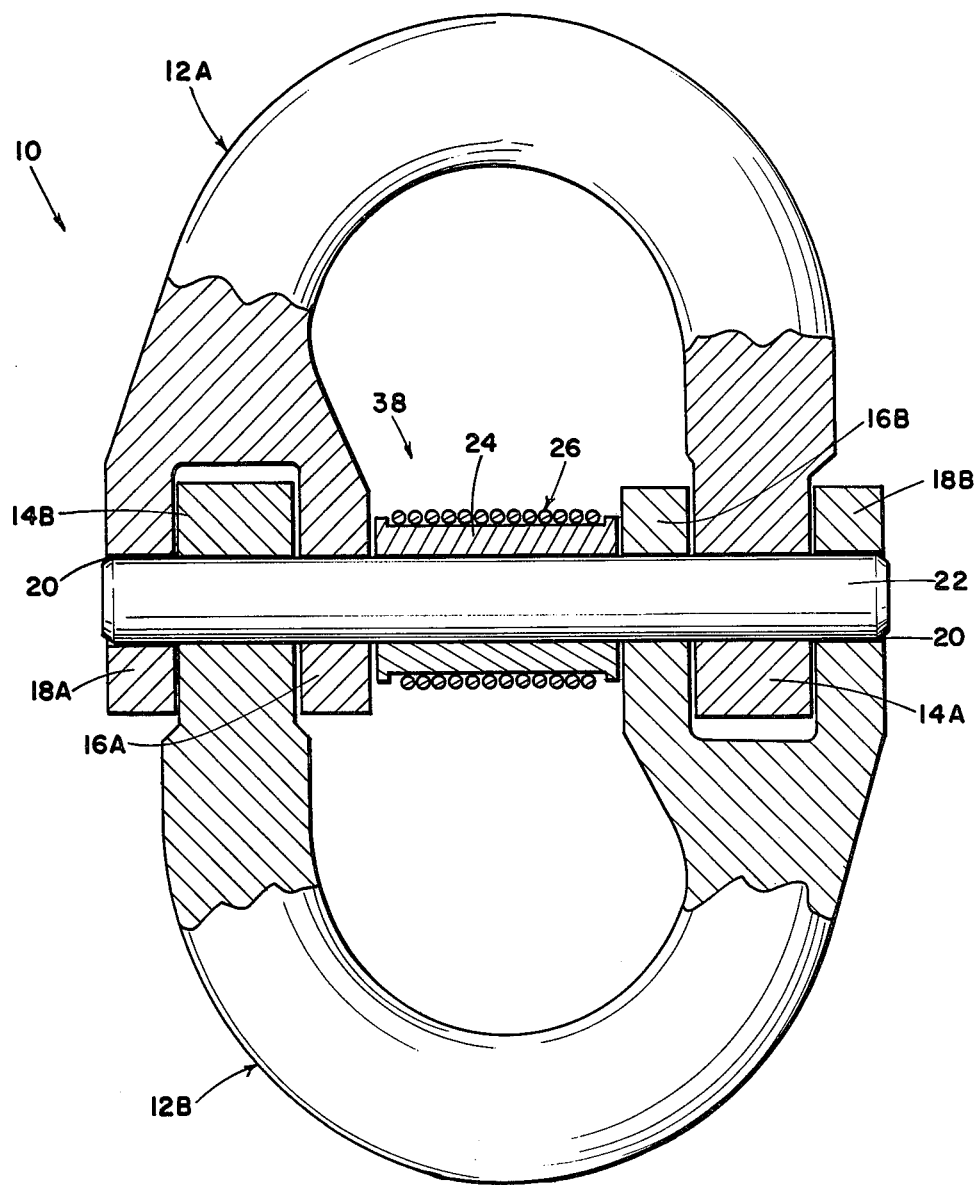
FIG. 1 illustrates in partial section one embodiment of the invention.

Referring now to the drawings and, in particular, to FIG. 1, there is shown one embodiment of this invention indicated generally by the numeral 10. It comprises a coupling link which includes two half links 12A and 12B, which in this embodiment are identical in construction, and are adapted to mesh together on a symmetrical basis.

Each of the half links 12A, 12B comprise a U-shaped member, which has on the end of each arm one or more ears 14, 16, 18, having a bored opening, the axes of which are substantially perpendicular to the arms of the U-shaped member.

Figure 8:
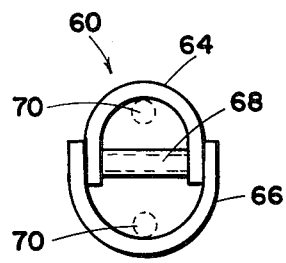
FIGS. 8 and 9 illustrate an alternate design of the half links which form the complete link.
Figure 9:
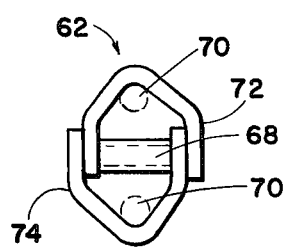

There is no limitation in this invention on the shape of the link, and half links, and other embodiments will be illustrated in FIGS. 8 and 9. The embodiment illustrated in FIG. 1 carries on one arm an ear indicated by the numeral 14A and on the other arm a pair of ears indicated by the numerals 16A and 18A, which are spaced apart by a distance slightly greater than the width of the ear 14A. Thus, the corresponding parts of two half links can coact with each other, so that the single ear 14 fits between the pair of ears 16 and 18 and all of the openings 20 through the ears will be coaxial, and of the same selected diameter.

A hardened steel pin of a diameter slightly less than the openings 20, is adapted to be passed through the openings in each of the ears to completely lock the two half links together. Normally the length of the pin will be substantially the same as the spacing between the outer surfaces of the ears 18A and 18B, so that there will be no projection of the pin that can catch on obstructions, and cause difficulties in the handling of the device.

The invention lies in the design of a retaining means, indicated generally by the numeral 38, which is of a length to fit between the ears 16A and 16B of the corresponding half links. The retaining means 38 comprises a cylindrical spacer 24 shown in FIG. 2. This comprises a cylinder having an internal opening 30 of a diameter substantially only slightly greater than that of a pin 22. This is machined with an external surface cylindrical, and may, if desired, have flanges 28 on one or both ends. After the spacer is constructed it is slit with a thin saw along a diametrical plan to provide a cut 32 which separates the two parts, which forms two identical half cylinders which are slightly thinner than a true half cylinder. When the two halves are pressed around the pin 22, there will be a narrow gap between the halves.

A spring means is provided, indicated generally by the numeral 26 which is placed around, and surrounds the outer surface of the spacer 24. The spring means ends to force the two halves 24A and 24B of the spacer together, eliminating the gap 32. In this position the internal surface is no longer a true cylinder so that when the pin 22 is driven into the opening 30 it will force the two halves 24A and 24B apart, until there is a small gap 32 between the two halves. However, because the machine surfaces on the inside of the spacer is of the same diameter as the pin there will be a uniform fit between the pin and the spacer over the entire inner surface. Now, when an external spring force is provided to force the two halves of the spacer together, against the pin, only a nominal external force is required to provide sufficient frictional force between the spacer and pin to effectively lock the pin in position in the link.

Figure 3:
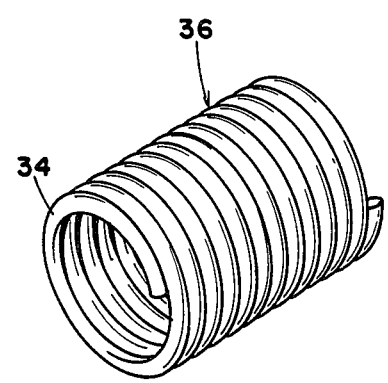
FIGS. 3, 4 and 5 illustrate different embodiments of the spring means that hold the two halves of the spacer together.
Figure 4:
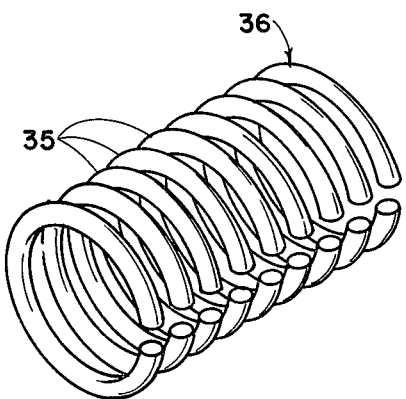
Figure 5:
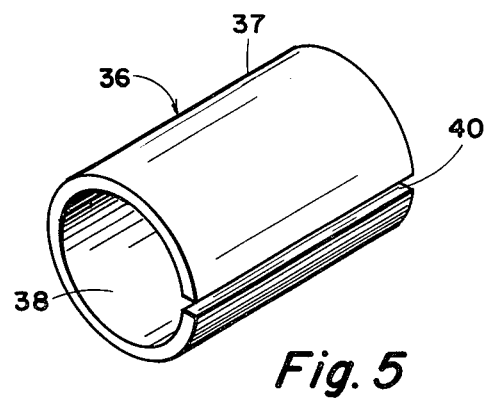

Illustrated in FIGS. 3, 4 and 5 are three alternate embodiments of a spring means to press the two halves 24A and 24B of the spacer together. One of these is a cylindrical helix made out of spring wire indicated by the numeral 34. Its internal diameter is slightly less than that of the surface of 24A, 24B, so that when the spring is wrapped around the spacer, it will provide a compression force on the two halves of the spacer, holding it together.

An alternate type of spring means is illustrated in FIG. 4 by the numeral 36. This comprises one, or a plurality, of open circular rings 35 of spring steel, of a suitable internal diameter. For example, the helix 34 of FIG. 3 could be cut along a diameter to form such a group of wire circles, indicated in FIG. 4. Each of these can be pressed individually onto the outer surface of the spacer 24.

When a plurality of separate spring members such as 36 of FIG. 4 are used, it is desirable to have a flange such as 28 on the spacer so that they may be retained on the spacer.

Illustrated in FIG. 5 is another type of circular spring means which comprises a spring sleeve. This is a thin cylindrical tube 37 of spring material having a longitudinal cut 40. The internal diameter 38 is slightly less than that of the outer surface of the spacer 24 so that when the spring sleeve is pressed over the outer surface of the spacer, the C-shaped tube will be spread apart forming a wider gap 40 and creating a resisting force in the spring material. This will compress the two halves 24A, 24B of the spacer holding them together with any selected value of spring force.

Figure 6:
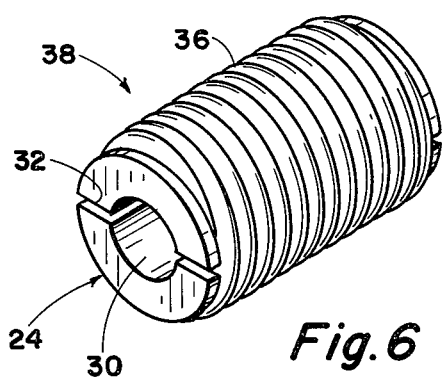
FIG. 6 illustrates the combined spacer and spring means.

In FIG. 6 is illustrated one embodiment of the retainer 38, which comprises the spacer 24 with the spring means 36. The spring means shown is that indicated in FIG. 3 although it could equally well be shown as summations of FIGS. 2 and 4, or FIGS. 2 and 5.

Figure 2:
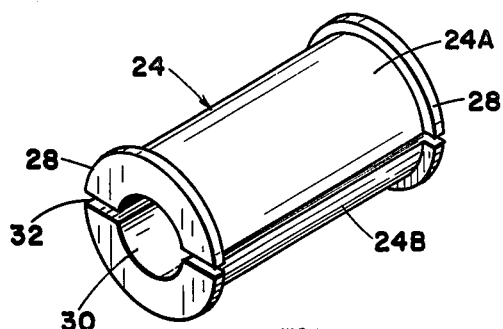
FIG. 2 illustrates one embodiment of the cylindrical spacer which locks the pin into the link.
Figure 7:
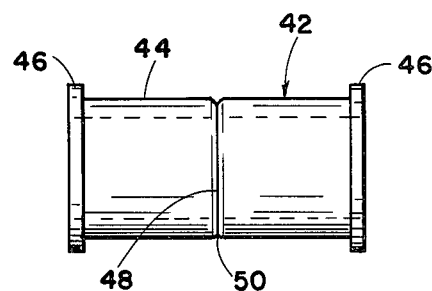
FIG. 7 illustrates another embodiment of the spacer means of FIG. 2.

In FIG. 7 is shown a modification of the embodiment of FIG. 2. This comprises the device of FIG. 2 with a transverse cut 48, preferably at the midpoint of the spacer. If desired the edges 50 of the cut can be chamfered, so as to permit easy entrance of each half of the spacer into either end of the spring elements of FIGS. 3 and 5.

As previously mentioned, the improvement of this device lies in the retaining means 38 which is adapted to hold the pin 22 within the openings 20 within the ears of the meshed links 12A, 12B. This locking means, or retaining means, 38 can be used with alternate types, of links only one of which is shown in FIG. 1. In FIG. 1, both of the links are identical, which simplifies the manufacture. In FIG. 8, there is illustrated also another embodiment indicated generally by the numeral 62 which provides two identical U-shaped members 72 and 74 which can be assembled and held by a suitable spacer 68. In FIGS. 8 and 9 the dashed circles 70 indicate connecting links of chain etc. Another embodiment is indicated in FIG. 9 in which the two half links are different, but the assembly is somewhat more symmetrical than in FIG. 8. Here one half link 64 has two ears which are narrower in spacing than the two ears of the half link 66. A locking or retaining means 68 is adapted to hold the pin in position to lock the two half links.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A coupling link comprising, in combination:
   (a) a first and a second half link, each half link comprising a U-shaped member, each of the ends of each of said U-shaped members having at least one ear, each of the plurality of ears having an opening therethrough, the axes of the plurality of openings substantially perpendicular to the arms of said U-shaped members;

(b) said plurality of ears adapted to interact with each other so that the openings through said at least four ears will be the same diameter and coaxial;

(c) a hardened steel pin adapted to be received in said plurality of coaxial openings to lock said two half links together;

(d) a cylindrical spacer of length slightly less than the dimension between the parallel faces of the two inner ears of said plurality of ears, having an axially opening substantially equal in diameter to that of said pin; said spacer cut along a diametral plane into two similar halves each slightly thinner than a semi-cylinder; and (e) spring means surrounding said cylindrical spacer, adapted to press said two halves together, forming a pin retaining means;

whereby when said pin retaining means is placed between the inner pair of ears, and said pin is inserted through the openings in said ears and through said retaining means, said spring means will press the two halves of said spacer to tightly grip said pin, and prevent its longitudinal movement.

2. The coupling link as in claim 1 in which said half links are identical and each arm has one ear.

3. The coupling link as in claim 1 in which each of said half links is different from the other and each arm has one ear.

4. The coupling link as in claim 1 in which said half links are identical, and in which one arm of a first half link carries one ear, and the second arm of the first half link carries two ears, spaced apart, to receive the single ear of the second link.

5. The coupling link as in claim 1 in which said pin has a length slightly less than the overall spacing between the outer surfaces of said ears.

6. The coupling link as in claim 1 in which said split cylindrical spacer has flanges on both ends to retain said circular spring means.

7. The coupling link as in claim 1 in which said circular spring means comprises at least one open circular, ring of spring material of lesser diameter than the outer diameter of said cylindrical spacer.

8. The coupling link as in claim 7 including a plurality of said open, circular, rings of spring material.

9. The coupling link as in claim 1 in which said circular spring means comprises a multi-turn helix of spring wire of inner diameter slightly less than the outer diameter of said cylindrical spacer.

10. The coupling link as in claim 1 in which said circular spring means comprises a spring sleeve of normal inner diameter less than the outer diameter of said cylindrical spacer.

11. The coupling pin as in claim 1 in which said cylindrical spacer has flanges on each end, and is cut into two parts on a plane perpendicular to its axis.

* * * * *